Aug. 5, 1969 F. ULRICH 3,459,959

INFORMATION COMPARING CIRCUITRY

Filed April 27, 1965 3 Sheets-Sheet 1

Fig. I

INFORMATION COMPARING CIRCUITRY

Filed April 27, 1965 3 Sheets-Sheet 2

Aug. 5, 1969 F. ULRICH 3,459,959

INFORMATION COMPARING CIRCUITRY

Filed April 27, 1965 3 Sheets-Sheet 3

3,459,959

INFORMATION COMPARING CIRCUITRY

Friedrich Ulrich, Stuttgart-Weilimdorf, Germany, assignor to International Standard Electric Corporation, New York, N.Y., a corporation of Delaware Filed Apr. 27, 1965, Ser. No. 451,292
Claims priority, application Germany, Apr. 28, 1964, St 22,043, St 22,044, St 22,045
Int. Cl. H03k *5/20*
U.S. Cl. 307—88 16 Claims

ABSTRACT OF THE DISCLOSURE

An information comparing circuitry utilizing magnetic crosspoint elements wherein one of the information items is used to control the comparing circuitry, thereby eliminating costly external control circuitry in the comparison of the information items.

This invention relates to data processing systems and more particularly to information comparing circuitry using magnetic crosspoint elements. In data processing systems it is often necessary to compare two information items provided by different sources for coincidence.

The circuitry for comparing the two independent information items can be simple when the items are in the same code.

Frequently it is necessary to compare for coincidence the information items appearing on the output leads of translators using magnetic crosspoint elements. In the past, expensive and complicated combinations of logic circuits have been used to provide such comparisons.

It is the object of this invention to provide new and unique information comparing circuitry for use with translators having magnetic crosspoint elements.

It is a related object of the invention to provide means for comparing a first and a second item in which at least one of the information items appears on the output leads of magnetic crosspoint elements. The output leads, according to the invention, are through connected to an OR circuit under the control of the first information item only when the output leads do not carry any of the second information items. Thus, if there is no coincidence, the OR gate provides an output.

It is a further object of the invention to provide simple and versatile circuit arrangements, that operate satisfactorily regardless of what type of information code is used for comparing two information items for coincidence when both appear on the output leads of magnetic crosspoint elements.

A still further object of the invention is to provide simple circuit arrangements for comparing two information items wherein at least one of said items appears on the output leads of magnetic crosspoint elements and that further these output leads receive a counter voltage under the control of the other information item.

In accordance with a preferred embodiment of this invention a plurality of magnetic cores have a plurality of output lines threaded therethrough in some predetermined pattern that results in output signals of a desired code when the magnetic state of the cores are varied by a first information input signals. The output lines are connected to an "OR" gate which produces an output signal if any of the inputs thereto carry a signal. Means controlled by second information input signals are provided for preventing any signals from reaching the "OR" gate if the first and second information signals coincide. Therefore, an OR gate output is obtained only in the event the first and second information signals do not coincide.

The above mentioned and other features of this invention and the manner of obtaining them will become more apparent, and the invention itself will be best understood by reference to the following description of an embodiment of the invention taken in conjunction with the accompanying drawings, in which.

Figure 1:
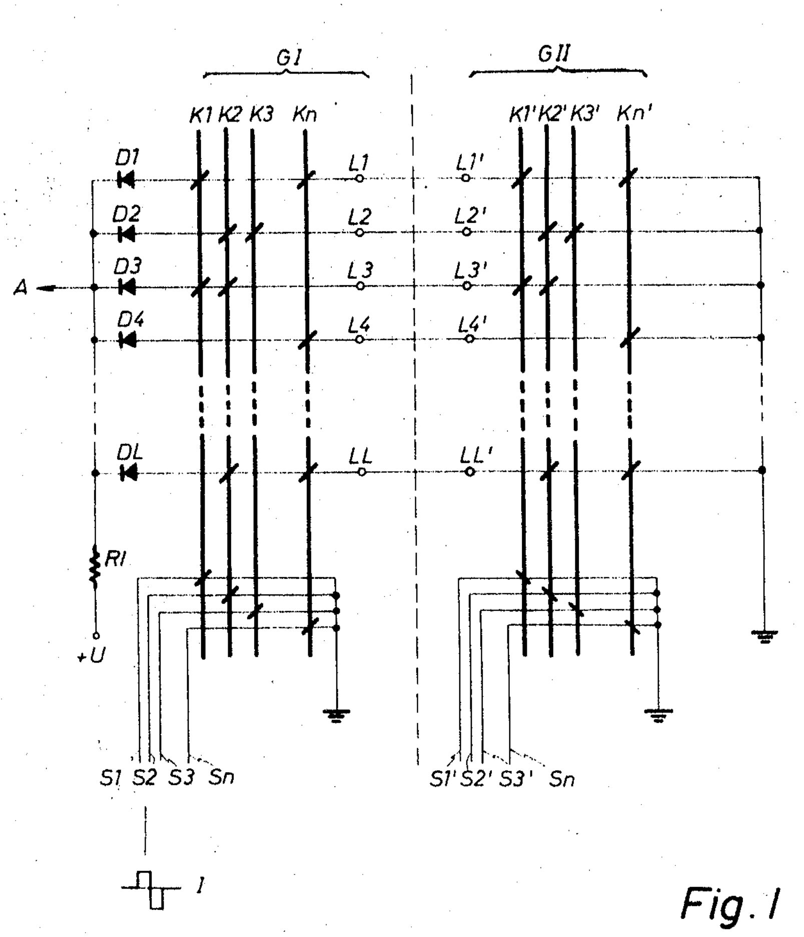
FIG. 1 illustrates in schematic form an embodiment of the invention wherein the first and second information items are both obtained from the output leads of magnetic crosspoint elements.

In the embodiment of FIG. 1 the magnetic cores K1 to K*n* and K1′ to K*n*′ of both groups GI and GII, are represented as vertical thick lines, whereas the output leads L1 to LL and L1′ to LL′ are shown as horizontal thin lines. The oblique short lines at the crosspoints indicate that the respective line is led through the magnetic core. The different angular position of said oblique lines indicating different threading directions. The input information is the magnetic condition of the cores K1–K*n* and K1′–K*n*′. It is these two informations that are to be compared. The informations are compared by supplying read-out commands to the cores.

The groups GI and GII of magnetic crosspoint elements may be parts of a translator such as disclosed in my copending application entitled "Translation Circuits," filed Nov. 24, 1964, Ser. No. 413,408 and assigned to the assignee of this invention, now abandoned. The translator furnishes the corresponding output information to the output leads L1 to LL and L1′ to LL′ respectively. The output information is a double pulse with each of the individual pulses having a different polarity. The output signals are obtained by a suitable actuation of the magnetic cores as indicated by the impulse I and the input control leads S1 to S*n* and S1′ to S*n*′.

In this embodiment the actuation of the magnetic crosspoint elements is made in the simplest way, in a 1-out-of-*n* code. That is, a pulse generator providing the actuating impulse I is connected, for example, to the magnetic crosspoint elements K1 and K1′ through the input control leads S1 and S1′. Since the output control leads L1 to LL and L1′ to LL′ of both groups are led in the same direction through the magnetic crosspoint elements, and the input control leads S1 to S*n* and S1′ to S*n*′ are led through said crosspoint elements in the opposite direction, pulses are induced in the leads L1–L1′ and L3–L3′ having opposite direction. When both information items coincide, the induced pulses on all loops L1–L1′ to LL–LL′ cancel each other for both partial pulses of the actuating impulse I. If either core K1 or core K1′ were not set to a particular magnetic setting, then the information items would not coincide and the pulses would not cancel each other out so that there would be an output at A as explained in the next paragraph.

If both information items do not coincide an induced impulse is missing on at least one output lead loop, either in the group GI or in the group GII where the aforementioned twin pulses are used. Since the OR circuit comprising the diodes D1 to DL and the resistor R1 coupled to battery furnishes a signal only for a defined polarity of the actuating pulses, the dual polarity pulses guarantees that in any case of error a partial pulse of the actuating impulse I can pass through to the output A of the OR circuit. It is thereby not important, whether the output impulse is missing in the group GI or in the group GII. Also, depending on the error, several output lead loops can participate in the signal and the signal can be effected by one and/or the other partial impulse of the actuating impulse I.

The magnetic crosspoint elements K1 to K*n* respectively K1′ to K*n*′ of both groups can also be actuated in different codes. For comparing both input information items, however, care must be taken that on the output leads L1 to LL and L1′ to LL′ the mutually aligned information signals furnish equal but oppositely polarized output signals. This can be obtained in a simple manner by suitable threading of the output leads. That means that the output leads L1 to LL need not be led in the same way through the associated magnetic cores K1 to K*n* as the output leads L1′ to LL′ through the magnetic cores K1′ to K*n*′.

For example, when the actuating circuits S1 to S*n* and S1′ to S*n*′ are excited in the same direction and the associated magnetic cores K1 to K*n* and K1′ to K*n*′ also magnetize in the same direction, the output leads L1 to LL of the magnetic cores K1 to K*n* are wound in the opposite sense to the output leads L1′ to LL′ of the magnetic cores K1′ to K*n*′. The effect on the "OR" circuit remains the same. That is, it provides an output only in the case of non-coinciding input informations.

Figure 2:
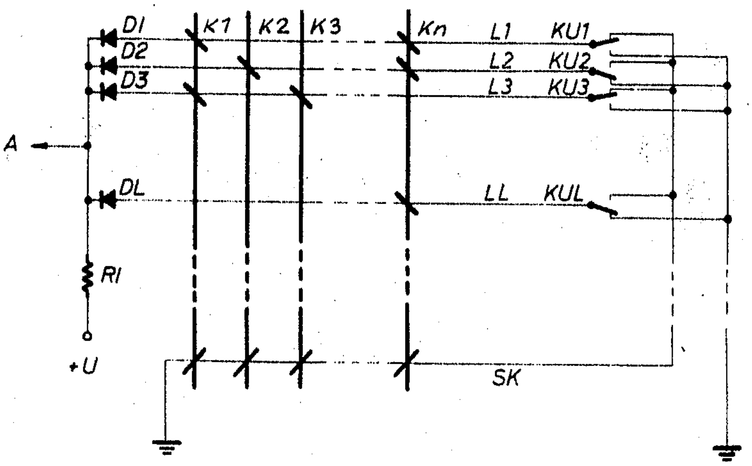
FIG. 2 illustrates in schematic form an embodiment of the invention wherein the first information items appear on the output leads of magnetic crosspoint elements and the second information item controls switching contacts which connect a counter voltage to the said output leads.

In the embodiment of FIG. 2 one information is offered on the output leads L1 to LL of the magnetic crosspoint elements K1 to K*n* as a twin-pulse with each of the individual pulses being of an opposite polarity. In FIG. 2, as in FIG. 1, the magnetic cores K1 to K*n* are shown as vertical thick lines and the output leads L1 to LL as horizontal thin lines. The oblique lines at the crosspoints indicate that the respective lead passes through the magnetic core.

The magnetic cores K1 to K*n* are, for example, a part of a magnetic translator such as the previously-mentioned magnetic-core translator, in which the cores may be actuated in any code, such as a 1-out-of-*n* code. Each of the *n* possible information items has a separate magnetic core. The magnetic cores can thereby be controlled in any well known way.

The magnetic cores can be actuated, for example, individually, or through several common inputs leads in parallel. This is, however, unimportant for the inventive information comparing circuit.

Assuming that, for example, the magnetic core K1 is reverse magnetized the output leads L1 and L3 bear output signals that comprise the first information items. The comparing or second information items are applied through the contacts KU1 to K*u*L by controlling the operation of these contacts. The first information is thus the setting of core K1 and the second information is the setting switches KU1 and KU3 to conduct the read-out command signal from crosspoint loop SK to the OR gates. Since crosspoint loop SK threads core K1 oppositely to the threading of leads L1 and L3, the pulse induced by core K1 in the crosspoint loop SK is cancelled out by the pulse induced by the threading of the core K1 by leads L1 and L3. If, however, either a different core was magnetized at this point, that is if the first information item was different, or if different switches are set, that is if the second information item was different, than a pulse would be received at the OR gate since there would be no cancellation of the signals. Thus, when the translation is made both information items supplement each other with reference to the output leads L1 to LL. Therefore, the leads L2 and LL, bearing no output signals, are through-connected via the contacts KU2 and KUL, in the released condition for direct connection to OR circuit inputs. The leads bearing output signals are connected to the crosspoint loop SK. In greater detail, in the example of FIG. 2 the contacts KU1 and KU3 connected the output leads L1 and L3 with the oppositely threaded crosspoint loop SK. Thus, the signals on the output leads L1 and L3 are cancelled when both information items coincide at each impulse of the twin-pulse output signal. Due to the cancellation, no signal appear at the output A of the OR circuit. Similarly, the directly through-connected output leads L2 and LL do not furnish control signals for the OR circuit when both information items coincide, because no pulses are induced on said output leads by the magnetic core K1, since leads L2 and LL do not pass through that core.

There are two possibilities for a fault causing the non-coincidence of both information items. The first possibility is that a lead, such as the lead L1, which in the example carries an output signal, is connected between the OR gate and ground through the contact KU1. Since the magnetic cores in an interrogation are always magnetized in both directions the previously mentioned twin-pulses occur on the output leads. Thus, one of the twin-pulses can always reach the output A of the OR circuit as a fault signal.

The second possibility of such a fault is that an output lead not carrying a signal is connected to the crosspoint loop SK which provides a counter-voltage. To obtain a fault alarm signal then the crosspoint SK furnishes the actuating pulse for the OR circuit. Thus, the output signals of the magnetic crosspoint elements in this embodiment must be twin-pulses. The counter-pulse from the crosspoint loop SK must cancel, in one case, the through-connecting pulse of the output lead; and, in the other case, provide an input to the OR circuit.

Figure 3:
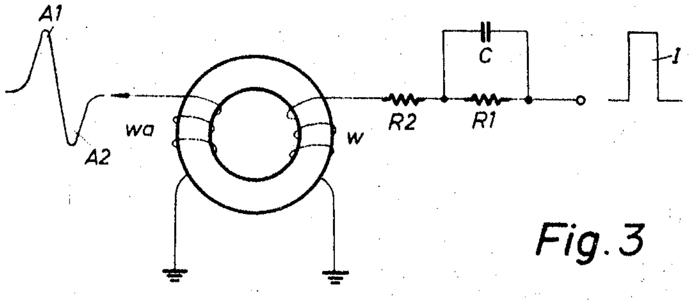
FIG. 3 illustrates in schematic form the single-directed actuation of a magnetic crosspoint element, furnishing two bidirectional pulses as output signals.

The twin-pulse output signals are produced in the simplest way by suitable actuation of the magnetic cores during translation and comparison. In greater detail, FIG. 3 shows the actuation of magnetic crossoint elements which furnishes twin-pulse output signals. At the commencement of the control pulse I only the current limiter resistor R2 is effective. The capacitor C is charged during the impulse to the impulse voltage and at the output winding *wa* the first impulse A1 appears. After the impulse has ceased the capacitor is discharged and impresses on the magnetic core an equally large current of opposite direction via the input winding *w*. Thereby, the second impulse A2 appears at the output winding *wa*. It is after the end of the control impulse I the capacitor C may be discharged via the pulse source in any well-known manner.

Figure 4:
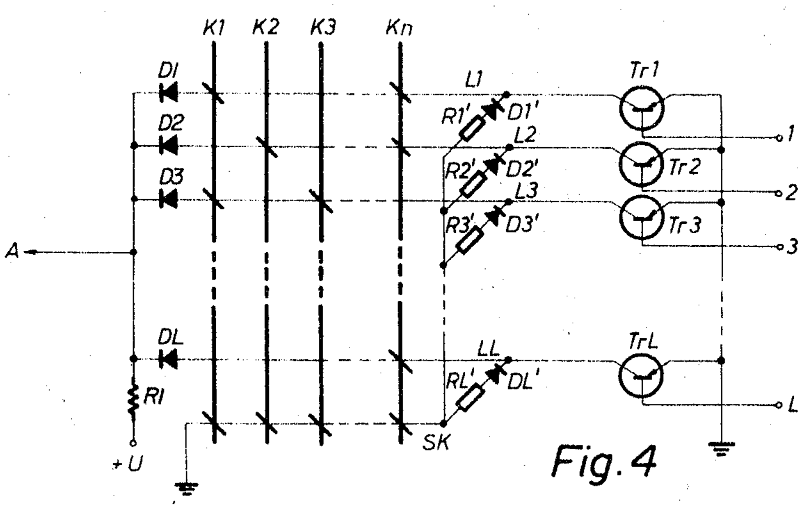
FIG. 4 illustrates an electronic version of FIG. 2.

FIG. 4 shows a deviation of the information comparing circuit of FIG. 2. In FIG. 4 electronic devices are actuated by the information being compared. Herein again the first information item is the setting of the core K1–K*n*. The second information item is the setting of the switches, in this case, the transistors TR1 through TRL, to interconnect the crosspoint loop SK to the leads L1–LL. Here again, the information items control each other for comparison purposes. Thus, the information items, for example, bias the transistors TR1–TRL to enable the transistors to control the diode gates so that either a read-out occurs if there is no coincidence of the items being compared, or so that no read-out occurs if there is coincidence of the information items being compared. The nonoperative positions of the contacts KU1 to KUL are provided by the diode gates R1′, D1′ to RL′, DL′, so that all output leads L1 to LL are connected with the crosspoint loop SK. Direct through-connection between the OR gate and ground of the output leads occurs over the electronic switches such as the transistors T*r*1 to T*r*L. The transistors are made conductive or nonconductive via separate inputs 1 to L in a way known per se. Thus, the mode of operation, for comparing both information items, does not differ from the one shown in the arrangement of FIG. 2.

Figure 5:
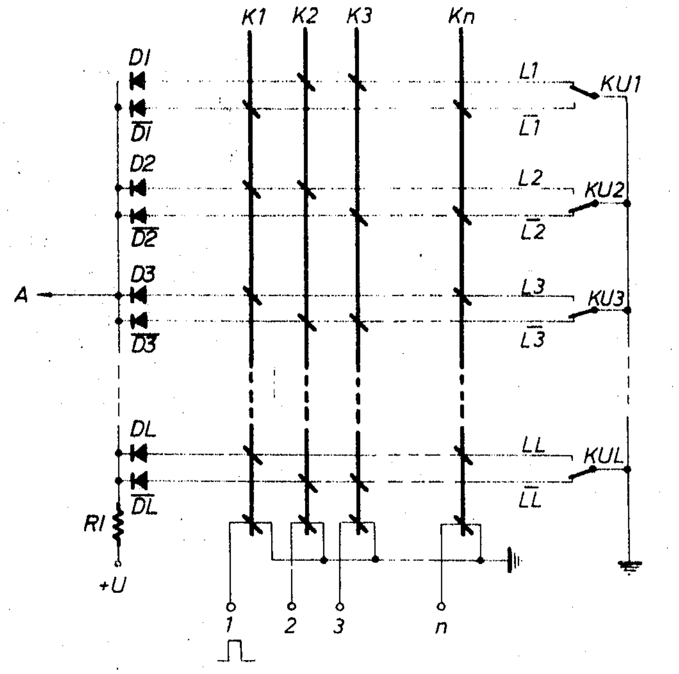
FIG. 5 illustrates in schematic form an embodiment of the invention wherein the first information items are obtained at the output leads of magnetic crosspoint elements and the second information items control switching contacts which prevent the completion of the circuits from the output lead carrying the first information items to the inputs of the OR gate.

In the inventive embodiment of FIG. 5 the magnetic crosspoint elements K1 to K*n* are parts of a magnetic translator. The mode of actuation of the magnetic core-type translator is of no importance for the understanding of this invention. Therefore, actuation of the magnetic crosspoint elements K1 to K*n* is represented in the 1-out-of-*n* code. If, for example, the input 1 is actuated the magnetic core K1 is reversed in its magnetism. (With regard to the accompanying figures it is to be mentioned that as in the previous figures of the drawings the magnetic cores are shown as vertical thick lines and the output leads L1, $\overline{L1}$ to LL, $\overline{LL}$ are drawn as horizontal thin lines. The oblique lines at the crosspoints indicate that the respective lead is led through the magnetic core. The position of the oblique lines indicate the direction of threading.) The first information item is the setting of the cores K1–K*n*. The second information item is the setting of the switches KU1–KUL. In this example, it is assumed that core K1 is the only one set. The switches are set as shown in FIG. 5. Output signals representing the first information items appear on the output leads $\overline{L1}$, L2, L3, LL, because these leads are connected with the magnetic core K1. The comparing or second information items effect only the output leads that carry output signals, via the contacts KU1 to KUL, when both information items coincide.

With both information items coinciding no output lead carrying a first information signal ($\overline{L1}$, L2, L3, LL) is through-connected, that is connected between the OR gate and ground. Thus, no signal can appear at the output A of the OR circuit comprising the rectifiers D1–DL and the resistor R1. When the output information furnished by the magnetic crosspoint elements deviates from the comparing information at least one of the leads bearing the output signals is through-connected. The OR circuit furnishes an output signal and indicates that both information items do not coincide.

If, for example, the core K2 is reversed in its magnetism the output leads L1, L2 $\overline{L3}$ and $\overline{LL}$ bear signals. Since the comparing information has through-connected the leads L1, $\overline{L2}$, $\overline{L3}$ and $\overline{LL}$ the OR circuit is controlled through the output leads L1, $\overline{L3}$ and $\overline{LL}$. Care must be taken that output leads are threaded through the cores so that the output signals actuate the rectifiers D1–DL of the OR circuit in the conductive direction. In any case, when one of both information items deviate the OR circuit will furnish a fault signal.

Threading of the output leads of the magnetic crosspoint elements can be adapted to the code of the comparing information (of the contacts KU1 to KUL). There is no limitation in selecting the output code of the magnetic circuit arrangement. The comparing information, too, need not be connected at the same time as the information furnished by the magnetic crosspoint elements. The output leads can be through-connected even before the comparison is performed.

While the principles of the invention have been described above in connection with specific apparatus and applications, it is to be understood that this description is made only by way of example and not as a limitation on the scope of the invention.

I claim:

1. Information comparing circuitry for determining the coincidence of first and second information signals, said circuitry comprising a plurality of first magnetic cores, a of a desired code when the magnetic state of the cores in a predetermined pattern resulting in output signals of a desired code when the magnetic states of the cores are varied by said first information signals, OR gate means for producing a fault signal responsive to the receipt of signals on the input terminal of said OR gate means, means for connecting each of said output lines to the input terminals of said OR gate, and inhibiting means controlled by said second information signals for preventing said output signals from reaching said OR gate input terminals when said first and second information signals coincide.

2. The information comparing circuitry of claim 1 wherein said inhibiting means comprises a plurality of second magnetic cores, a plurality of second output lines, means for serially connecting said first output lines and said second output lines between said OR gate input terminals and ground, and means responsive to said second information signals for providing second output signals on said second output lines that are of equal amplitude and of opposite polarity to said first output signals on said first output lines.

3. In the information comparing circuitry of claim 2 first input winding means associated with each of said first cores, and means for coupling said first information signals comprising pulses having positive and negative portions to selected ones of said first input windings for reversing the magnetic state of selected ones of said cores to produce said first output signals on said first output leads threading said selected ones of said cores.

4. In the information comparing circuitry of claim 3 second input winding means associated with each of said second cores, and means for providing said second information signals to said second input winding means to produce said second output signals that cancel said first output signals when said first and second information signals coincide.

5. In the information comparing circuitry of claim 4, and means for threading said second input windings through each of said cores in a direction opposite that of said first input windings through said first cores, whereby said second output signals are equal in amplitude and opposite in polarity to said first output signals.

6. The information comparing circuitry of claim 1 wherein said OR gate comprises unidirectional means connected between said OR gate input terminals and said OR gate output for providing a signal at said OR gate output responsive to a signal of a certain polarity applied to any of said input terminals.

7. The information comparing circuitry of claim 6 wherein means are provided for obtaining dual polarity output pulses.

8. In the information comparing circuitry of claim 7, and input winding means operated responsive to unidirectional input pulses for providing bidirectional output pulses.

9. The information comparing circuitry of claim 8 wherein said input winding means comprises first and second resistors serially connected to said input winding means, and capacitor means bridging said first resistor.

10. The information comparing circuitry of claim 1 wherein control output line means are threaded through each of said cores for producing a control output equal in amplitude and opposite in polarity to said first output responsive to the changes in magnetization of any of said cores, and wherein said inhibiting means comprises switch means connected to each of said output lines and operated responsive to said second information signals for connecting selected ones of said output lines to said control output lines in the operated position.

11. The information comparing circuitry of claim 10 wherein said switching means comprises semiconductor means.

12. The information comparing circuitry of claim 11 wherein diode means are provided for individually coupling said control line to each of said output lines, and wherein said switching means comprises transistor switching means for biasing said diode means for selectively coupling said output lines to said control output line by properly biasing said diode means for conduction.

13. The information comparing circuitry of claim 1 wherein said inhibiting means comprises separate switching means for connecting each of said output lines to ground, individual control winding means threaded through each of said cores for selectively changing the state of magnetization of a selected one of said cores responsive to said first information signal, each of said output lines comprising a pair of output conductors with one of each of said pair of conductors threading the cores not threaded by the other of said conductors, said switching means connecting one of said pair of said conductors to ground in the non-operated position and said switching means operated responsive to said second information signals for connecting the other of said conductors to ground.

14. The comparing circuitry of claim 13 wherein said OR gate means comprises a diode gate.

15. The comparing circuitry of claim 14 wherein said first and second information signals are asynchronous.

16. The information comparing circuitry of claim 15 where said first information signals comprise unidirectional pulses.

References Cited

UNITED STATES PATENTS

| | | | |
|---|---|---|---|
| 2,973,506 | 2/1961 | Newby | 340—174 XR |
| 3,143,668 | 8/1964 | Bloodworth et al. | 307—88 XR |
| 2,879,498 | 3/1959 | Kalin | 235—177 |

OTHER REFERENCES

Leightner, R. A.: Multiple Ring, Sum Logic Unit, IBM Technical Disclosure Bulletin, vol. 2(6), April 1960, pp. 96–97.

BERNARD KONICK, Primary Examiner

G. M. HOFFMAN, Assistant Examiner

U.S. Cl. X.R.

340—146, 174